(12) United States Patent
Godshaw et al.

(10) Patent No.: US 7,568,600 B2
(45) Date of Patent: Aug. 4, 2009

(54) TANK BAG WITH INTEGRAL CORD ADJUSTMENT SYSTEM

(75) Inventors: Donald E. Godshaw, Evanston, IL (US);
Andrezj M. Redzisz, Wheeling, IL (US); Hai Du, Mt. Prospect, IL (US)

(73) Assignee: Travel Caddy, Inc., Elk Grove Village, IL (US)

(*) Notice: Subject to any disclaimer, the term of this patent is extended or adjusted under 35 U.S.C. 154(b) by 409 days.

(21) Appl. No.: 11/335,374

(22) Filed: Jan. 19, 2006

(65) Prior Publication Data
US 2007/0164068 A1    Jul. 19, 2007

(51) Int. Cl.
*B62J 7/00* (2006.01)
*A45F 3/04* (2006.01)

(52) U.S. Cl. .................. 224/429; 224/440; 224/650

(58) Field of Classification Search ............... 224/429, 224/650, 668, 269, 440, 924
See application file for complete search history.

(56) References Cited

U.S. PATENT DOCUMENTS

| | | | | |
|---|---|---|---|---|
| 2,813,602 A | * | 11/1957 | Macarthur, Jr. ............. 224/220 |
| 4,442,960 A | * | 4/1984 | Vetter .......................... 224/417 |
| 4,580,706 A | * | 4/1986 | Jackson et al. .............. 224/427 |
| 5,129,560 A | * | 7/1992 | Herman ....................... 224/579 |
| 5,586,703 A | * | 12/1996 | Radar et al. ................. 224/601 |
| 5,810,230 A | * | 9/1998 | Nutto ........................... 224/417 |
| D404,910 S | * | 2/1999 | Schober ....................... D3/216 |
| 5,890,639 A | * | 4/1999 | Hancock et al. ............. 224/429 |
| 6,547,113 B1 | * | 4/2003 | Hancock et al. ............. 224/408 |
| D544,708 S | * | 6/2007 | Barker ......................... D3/216 |
| 2005/0077329 A1 | * | 4/2005 | Sconzo ........................ 224/153 |

OTHER PUBLICATIONS

Kolpin Outdoor Innovation Catalogue entitled "ATV Accessories Catalogue 2004".
Kolpin All Terrain Innovation Catalogue entitled "ATV Accessories 2005".
www.tourmaster.com, ATV Tank Saddle Bag, pp. 1-3.
www.onlineparts.com, Moose ATV Tank Bags, pp. 1-2.
www.greenemountain.net, Tank Saddle Bags, p. 7 of 8.
www.atvstuff.com, Tank Bag, p. 2 of 3.
www.motorcycle-superstore.com, Tourmaster cortech ATV Tank Saddlebags, pp. 1-2.
www.texas-hunters.com, Quad Gear ATV Tank Cargo Bag, pp. 1-2.
www.stearnsinc.com, A301-Pro 2 Three Way Handy Bag, p. 1 of 1.
www.stearnsinc.com, A201—Pro Three Way Handy Bag, p. 1 of 1.
www.stearnsinc.com, A101—Excel Three Way Handy Bag.
www.atvlogic.com, SB-6B, C & MO ATV Tank Saddlebags, p. 1 of 1.
www.kodiakoutback.com, Pinnacle Zipperless Tank Saddle Bag, pp. 1-2.
www.quadboss.com, Saddlebags, p. 1 of 1.
www.tourmaster.com, TB-18 Tank Bag, p. 2 of 3.
www.tamarackatv.com, Soft Select Series, p. 3 of 4.

* cited by examiner

*Primary Examiner*—Nathan J Newhouse
*Assistant Examiner*—Lester L Vanterpool
(74) *Attorney, Agent, or Firm*—Banner & Witcoff, Ltd.

(57) ABSTRACT

A tank bag for a vehicle such as an all terrain vehicle or motorbike includes bags for placement on each side of a center ridge of the vehicle. The bags are connected by adjustable straps and a bridging panel. Hook elements are included to maintain the bag construction in a fixed position on the vehicle.

18 Claims, 7 Drawing Sheets

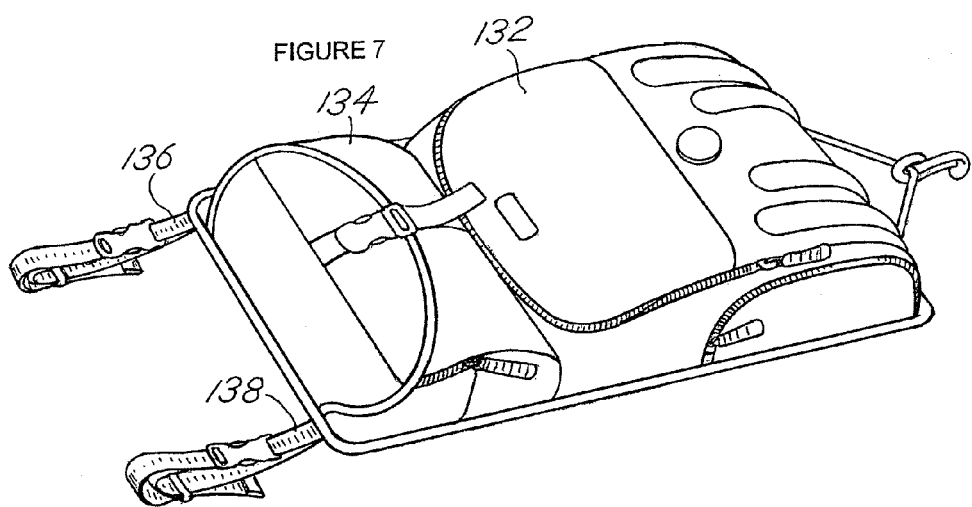
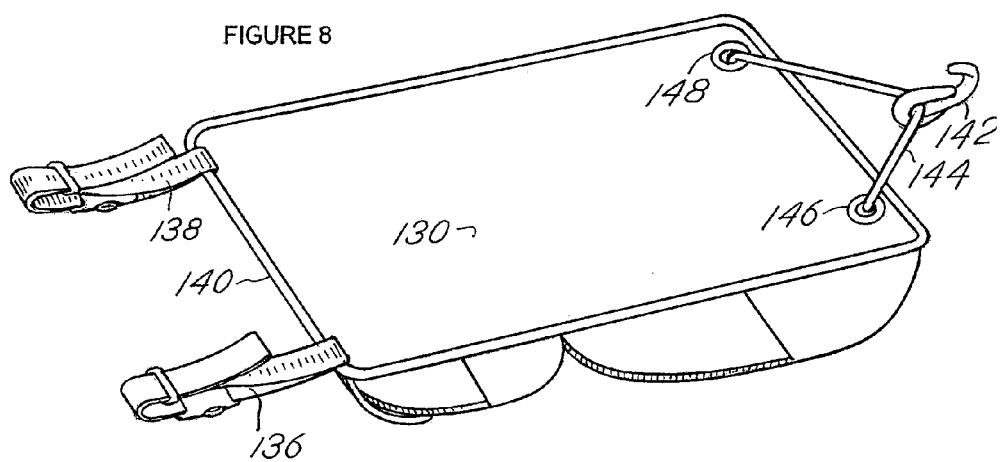

TANK BAG WITH INTEGRAL CORD ADJUSTMENT SYSTEM

BACKGROUND OF THE INVENTION

In a principal aspect the present invention relates to a baggage construction, sometimes referred to as a tank bag, used on motorcycles and all terrain vehicles.

Baggage constructions having the general configuration of a saddle bag have been used with motorcycles, all terrain vehicles and bikes for many years. Typically, such constructions include first and second bags connected by a center web. One bag is positioned on each side of a center tank or center ridge of the vehicle. The bags are often attached to the vehicle by means of straps, snaps, buckles, hook and loop fasteners (Velcro fasteners), or combinations thereof. For example, the gas tank of a motorcycle or all terrain vehicle is typically located along the longitudinal centerline axis of the vehicle. A saddle bag type construction (tank bag) is positioned over this center ridge with a storage pocket being positioned on each side of the tank or center ridge. Historically, such tank bags were comprised of first and second bag structures connected by a soft, supple or flexible material which straddles the center ridge over the gas tank and vehicle engine. The material connection typically provides little accommodation for the distance between the pockets or sides of the tank or center ridge of the vehicle. Other types of dimensional requirements are also often unsatisfied with the result that the bags do not fit properly on the vehicle. Additionally, the connection mechanism for such bags is not always fully functional or otherwise satisfactory.

Thus, there has developed the need to provide an improved tank bag for vehicles such as motorcycles, all terrain vehicles, bicycles and the like.

SUMMARY OF THE INVENTION

Briefly, the present invention comprises a bag assembly or baggage for all terrain vehicles, motorcycles or the like which includes first and second, spaced, separate storage bags or pockets, each bag being mounted on a semi-rigid support or back side panel with a generally flexible, bag enclosure or pockets affixed to each back side panel. The back side panels are joined to a center, bridging panel and straps. The center bridging panel thus includes connection links or straps extending from a generally rectangular shaped center bridging panel connected by straps on each side of the center panel, respectively, to each of the back side, semi rigid panels that support storage bags. The length of the straps is adjustable to thereby enable the assembly to accommodate or fit on variously sized vehicles.

The center bridging panel fits over the center section of the motorcycle, motor bike or all terrain vehicle and typically includes a center passage which will fit over a gas tank cap, for example, to help align the bag on the vehicle. The connection links or connection straps extending from the center bridging panel include fasteners at their outer ends which connect to the inside face of a flap that protectively covers the straps and the storage bags to which the straps are attached. Thus, the connection links or straps are protected and will not interfere with or accidentally catch on a portion of the vehicle or on the rider of the vehicle.

Each back side panel further includes hook members which are attached by cords or tethers extending through the back side panel to the inside of the bag enclosures that are supported by the back side panels. The hook elements or members may thus be attached to the vehicle as the cords for the hook elements are adjusted in length. In this manner, the adjustable hook elements may be adjusted to accommodate various sizes of bikes, all terrain vehicles and the like. Because the adjustment mechanism for each of the hook elements is within the bag enclosure and the cord or tether extends out through the back side panels, the tether will not interfere with or be caught accidentally by the individual using the bag construction thereby enhancing the safety of the construction.

In a preferred embodiment, one hook element is associated with the bottom side of each of the back side panels and is connectable to the lower edge of the vehicle, for example. An additional hook element for each bag may extend forwardly from the back side panel and be connected to the forward part of the chassis of the vehicle. The hook elements from the separate back side panels may also be fit under a gas tank or center bar of the vehicle and be connected together to hold the bag assembly in a fixed position on the vehicle.

Thus, it is an object of the invention to provide a tank bag assembly for all terrain vehicles, motorcycles, bikes and the like which may be adjusted to accommodate vehicles of various size and configuration.

It is a further object of the invention to provide a baggage construction for an all terrain vehicle, motorcycle or the like which is economical, rugged, has a large storage capacity and is easy to use.

Another object of the invention is to provide a tank bag assembly with an adjustment system for accommodating various sizes of vehicles.

Another object of the invention is to provide a tank bag assembly which includes an assembly of tethered hook elements that will maintain the bag in the desired position mounted on the vehicle.

These and other objects, advantages and features of the invention will be set forth in the detailed description that follows.

BRIEF DESCRIPTION OF THE DRAWING

In the detailed description which follows, reference will be made to the drawing comprised of the following figures:

FIG. 7 is a front side isometric view of an alternative side bag construction; and FIG. 8 is a back side isometric view of the side bag construction of FIG. 7.

DESCRIPTION OF THE PREFERRED EMBODIMENT

Figure 1:
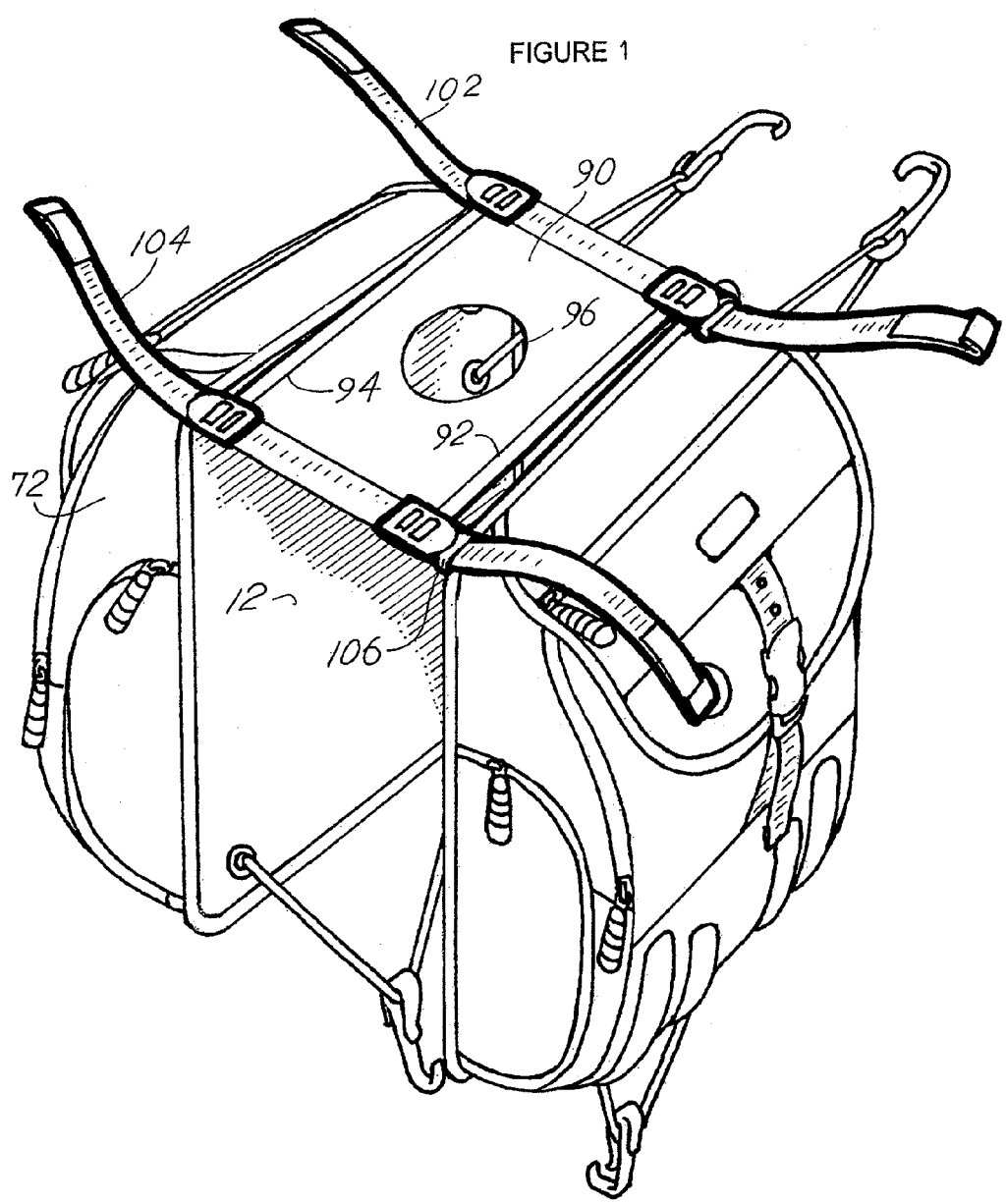
FIG. 1 is an isometric view of the baggage construction of the invention in a preferred embodiment.
Figure 2:
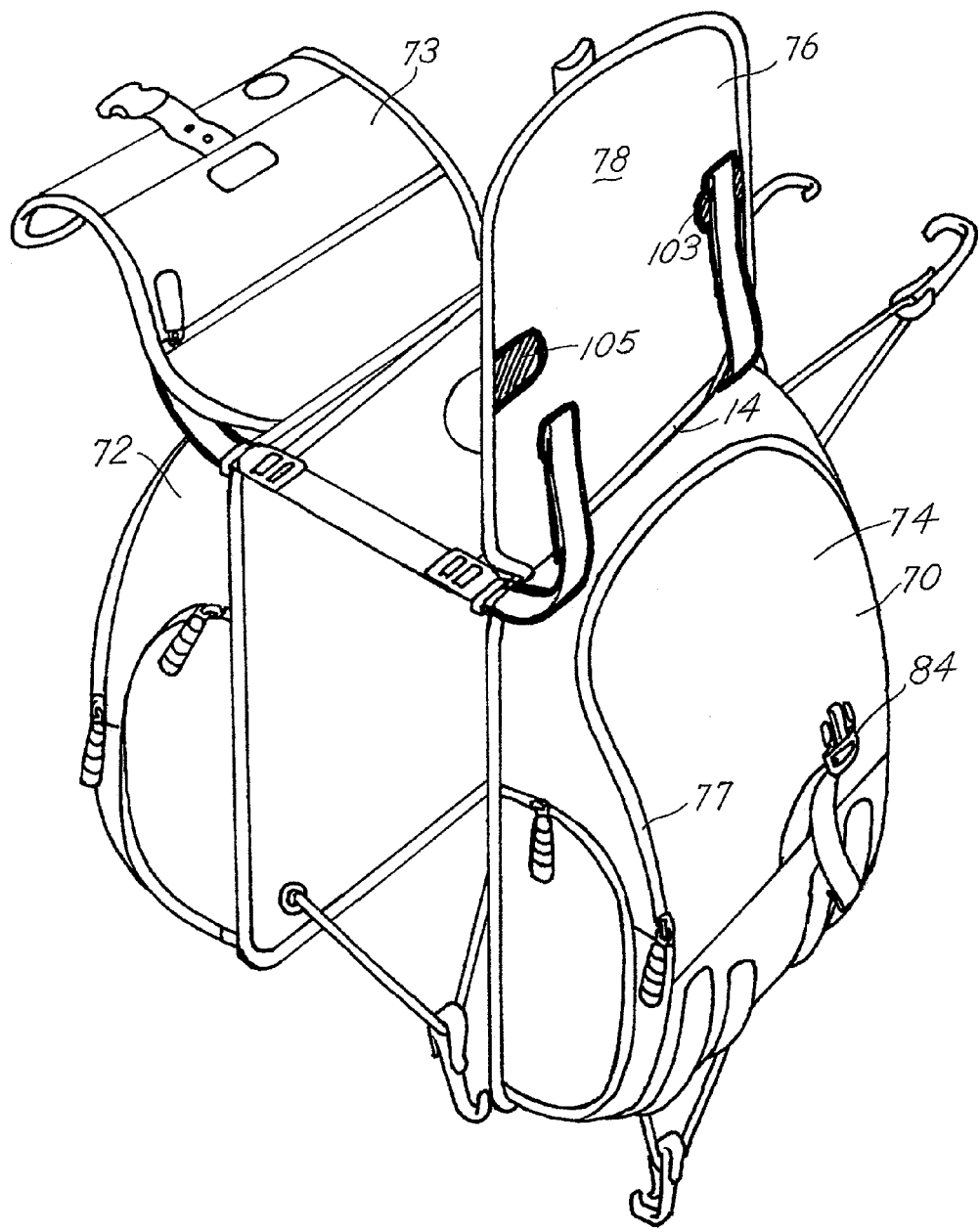
FIG. 2 is an isometric view of the embodiment of FIG. 1 depicting the manner in which the connection straps associated with a center bridging panel may be attached to a cover flap to facilitate the storage of a connection strap.
Figure 3:
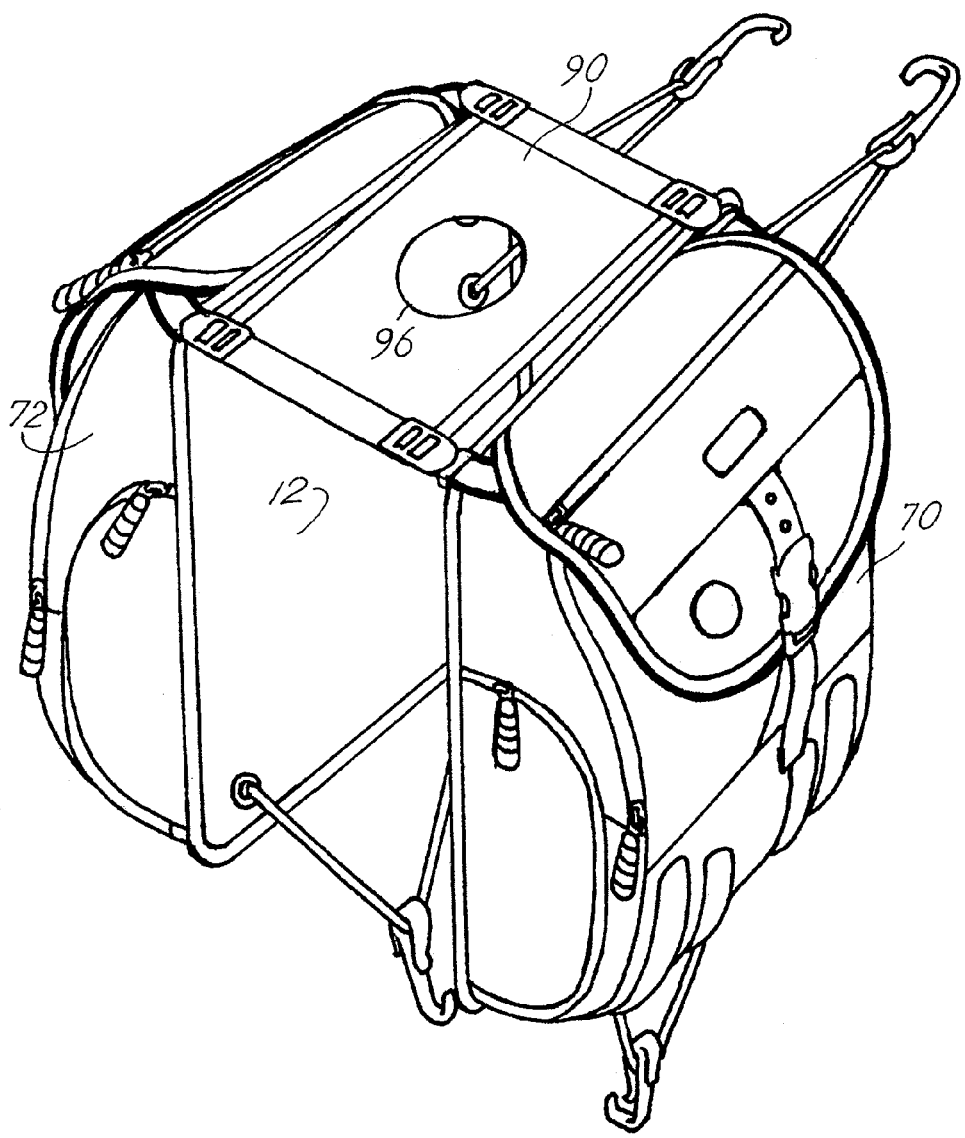
FIG. 3 is an isometric view of the embodiment of FIG. 2 wherein the connection straps are attached to the inside face of a cover flap.
Figure 4:
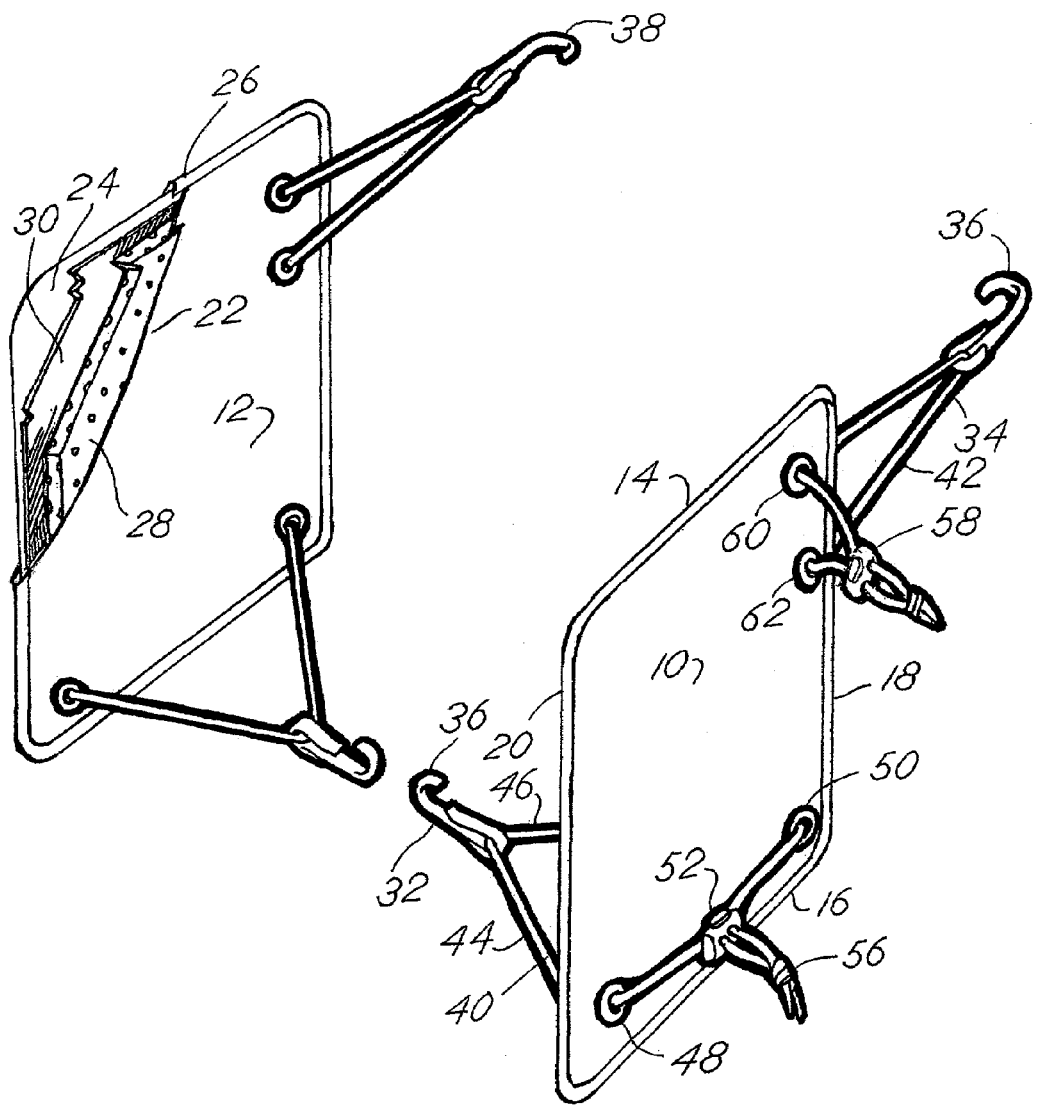
FIG. 4 is an isometric view depicting the construction of the back side panels associated with each of the bags of the tank bag assembly of the invention depicting the manner in which the hook elements are constructed and rendered adjustable.

Referring to the figures, the baggage construction or tank bag assembly (often termed a tank bag) of the invention is depicted in a preferred embodiment. The tank bag includes a first back side panel 10 and a second, generally congruently sized, back side panel 12. The back side panels 10, 12 in a preferred embodiment are generally rectangular and include a top edge 14, a bottom edge 16, a front lateral side edge 18 and a back lateral side edge 20. Preferably, the back side panels 10, 12 are rigid or semi rigid and include an inside layer 22 of fabric material, for example, canvas, and an outer layer 24 of similar material, sewn together with a peripheral binding 26 and further including an internal cushion material 28 such as an expanded, closed cell foam and a semi rigid or rigid board 30 such as a polyethylene or polypropylene board all retained in the envelope formed by the fabric panels 22 and 24. Board 30 may be contoured to fit along the side of the center ridge of the vehicle.

In a preferred embodiment, each back side panel 10, 12 includes a first, downwardly depending hook element 32 and a second forwardly extending hook element 34. Each of the hook elements 32, 34 includes a hook 36 and 38 respectively and a connecting cord or tether 40 and 42 respectively. The cords 40 and 42 are tethers which connect the hook elements 32, 34 to the back side panels 10, for example. The tethers 40, 42 thus each include a first link or run 44 and a second link or run 46 which fit, respectively, through spaced openings 48 and 50 along the lower edge 16 of the back side panels 10, 12 and are connected by a cord lock mechanism 52. The ends of the cord runs 44 and 46 are also tied together in a knot 56. The cord length adjustment lock mechanism 52 may be operated to adjust the length of the runs 44 and 46 from the inside of the bags or pouches 70, 72 referenced hereinafter. In similar fashion, the cord 42 acts as a tether for the hook 34 and includes an adjustment mechanism 58 for the cord 42. The cord 42 is connected through openings 60 and 62 along the front side edge 18 of back side 10. The back side panel 10 and the back side panel 12 are generally symmetrical, mirror images of one another. The cords may be elastic or non-elastic.

Attached to the outside face of each of the back sides or back side panels 10 and 12 is a pouch 70 and 72 respectively. Typically, each pouch 70, 72 is made from canvas or other heavy fabric material and is attached to a back side panels 10 and 12 respectively by binding which is sewn to the back side panels 10 and 12 respectively. Usually the pouches 70 and 72 are substantially identical. However, various sizes and configurations of the pouches may be incorporated in the tank bag without departing from the spirit and the scope of the invention. For example, the pouch 70 may include an access flap 74 which may be opened by operation of a zipper 77. Other zippers and pockets may be incorporated with the side bag or carrier pocket 70. Multiple pockets may be attached to the back side panels 10, 12.

Preferably, a cover flap 76 having an inside face 78 and an outside face 80 is provided and attached to upper side edge 14 of back side panel 10. The attachment is made, for example, by sewing so that the flap 76 may pivot about the edge 14. The pouch 72 includes a similar flap 73 which functions generally in the same fashion as the flap 76. The flap 76 may be fastened to the bag or pouch 70 by means of a strap 82 which connects with a buckle 84 generally aligned with the midpoint of the pouch 70. Flap 76 thus provides additional protection and additional means for maintaining the contents of the pouch or bag 70. Note the width of the flaps 73, 76 along the edge 14, 26 is less than the width of edge 14.

Figure 5:
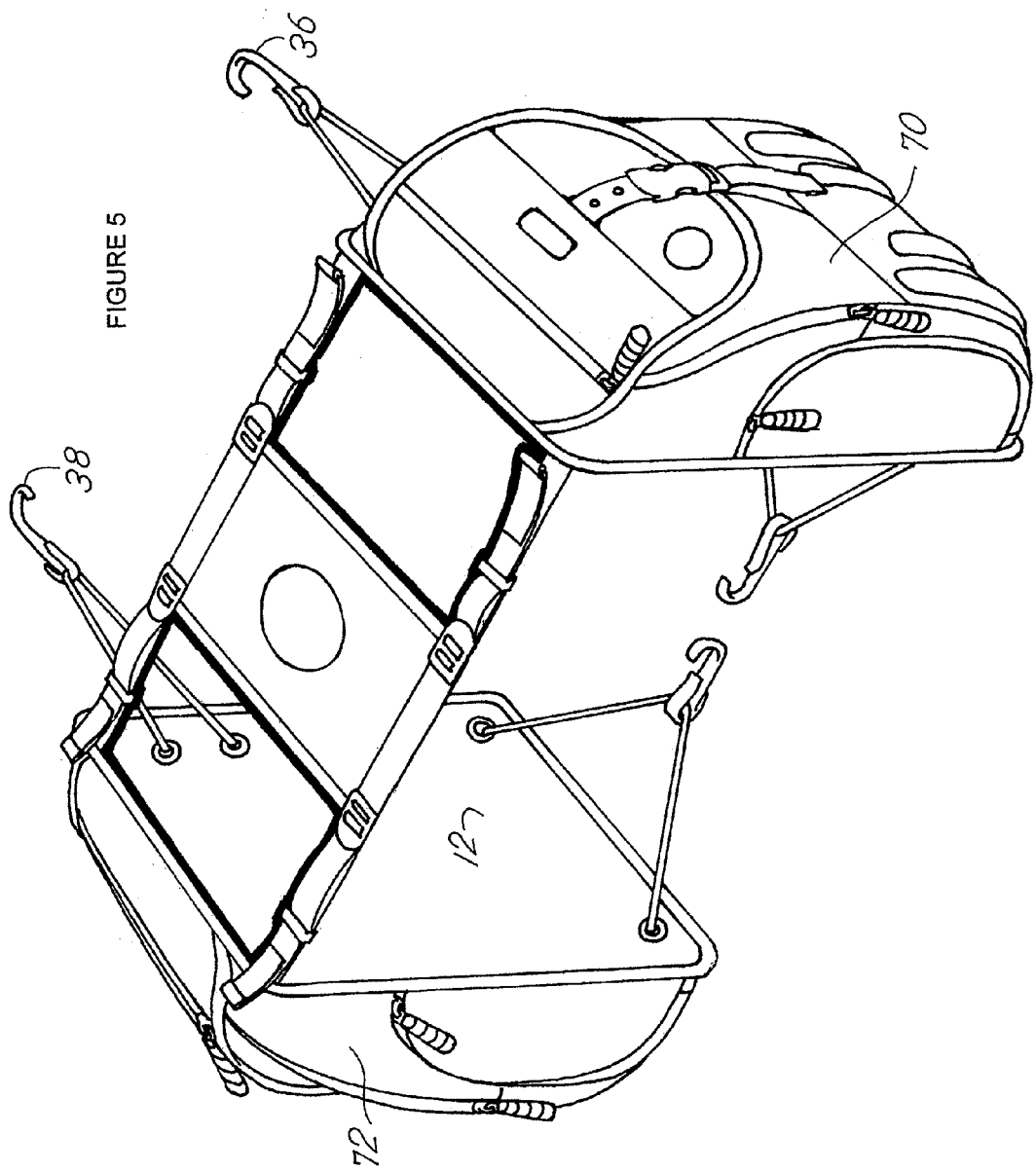
FIG. 5 is an isometric view of the embodiment of FIG. 1 wherein the connection links between a center bridge panel and the separate side bags of the baggage are adjusted in length to accommodate a vehicle having a particular size.

A center or bridging panel 90 is positioned between the panels 10, 12 and pouches or bags 70 and 72. In a preferred embodiment, the center or bridging panel 90 is generally rectangular in configuration and includes longitudinal side edges 92 and 94 generally aligned with the lateral top side edges 14 and 26 of the back side panels 10 and 12. Adjustably attached to the center panel or bridging panel 90 are adjustable length connection links or straps 98, 100, 102 and 104. These respective straps 98, 100, 102 and 104 are connected to buckle elements, such as elements 106 and 108, and enable adjustment of the distance between the lateral side edges 92 of the center or bridge panel 90 and the top side edge 14 of the back side panel 10. In this manner, as detailed in FIG. 5, the tank bag may be adjusted to accommodate the size of the center bridge construction of an all terrain vehicle, for example.

The outer ends of the straps 98 and 100 include hook and loop fastener material 99 and 101 which is cooperative with hook and/or loop fastener material 103 and 105 respectively on the inside face 78 of the flap 76. In this manner, the ends of the straps 98 and 100 can be appropriately held in position on the inside face 78 of the flap 76 so that they will not interfere with the bag 70 when it is placed in its useful position on a vehicle. The opposite pocket or bag 72 also includes a similar flap construction 73. Also, as disclosed previously, the width of the flaps 72, 76 along sides 14, 26 may be narrower so that the straps 98, 100 will easily fit around the flaps 72, 76 at the edges thereof and against the underside thereof.

The bridging panel or center panel 90 further includes a centrally located passage or opening 96 located generally midway between the sides 92 and 94 of the panels 90. Typically, the panel 90 is rectangular, but other configurations such as trapezoidal or triangular may be employed. This opening 96 will accommodate the gas tank cap, for example, or a shift lever etc. It may also be off-center.

FIGS. 7 and 8 illustrate alternative constructions for the side bags or pouches useful in combination with the center or bridging panel or as alternatives to the center or bridging panel. That is, referring to FIGS. 7 and 8 a backside panel 130 has a construction similar to that previously described including a generally rectangular configuration with a rigid interior board or member covered by fabric. Zippered pouches 132 and 134 are attached to the front side of the back panel 130. Adjustable straps 136 and 138 are attached along the top edge 140 of the backside panel 130. The straps 136 and 138 may thus be attached to a center panel of the type described previously or may be attached to one another when bag constructions of the type shown in FIGS. 7 and 8 are positioned on opposite sides of the center section of a vehicle, such as a motorcycle.

Further, a hook element or hook member 142 is attached by means of a cord or elastic link 144 through openings 146 and 148 to the interior of the pouch 132 where a locking mechanism of the type previously described is maintained and the ends of the cord 144 are joined together to permit adjustment in the length of the cord 144. Additionally, the cord 144 may be an elastic cord, such as a bungee type cord. Again, with the construction as described, the backside panel 130, which is generally rigid or semi-rigid, in combination with the hook element 142, which is adjustable within the pocket 132, enables enhanced ability to attach the pouch assembly to an all terrain vehicle or the like in a manner which permits safe adjustment and limited access to cord, straps, hooks and the like which otherwise might interfere with the person on or using the vehicle.

Figure 6:
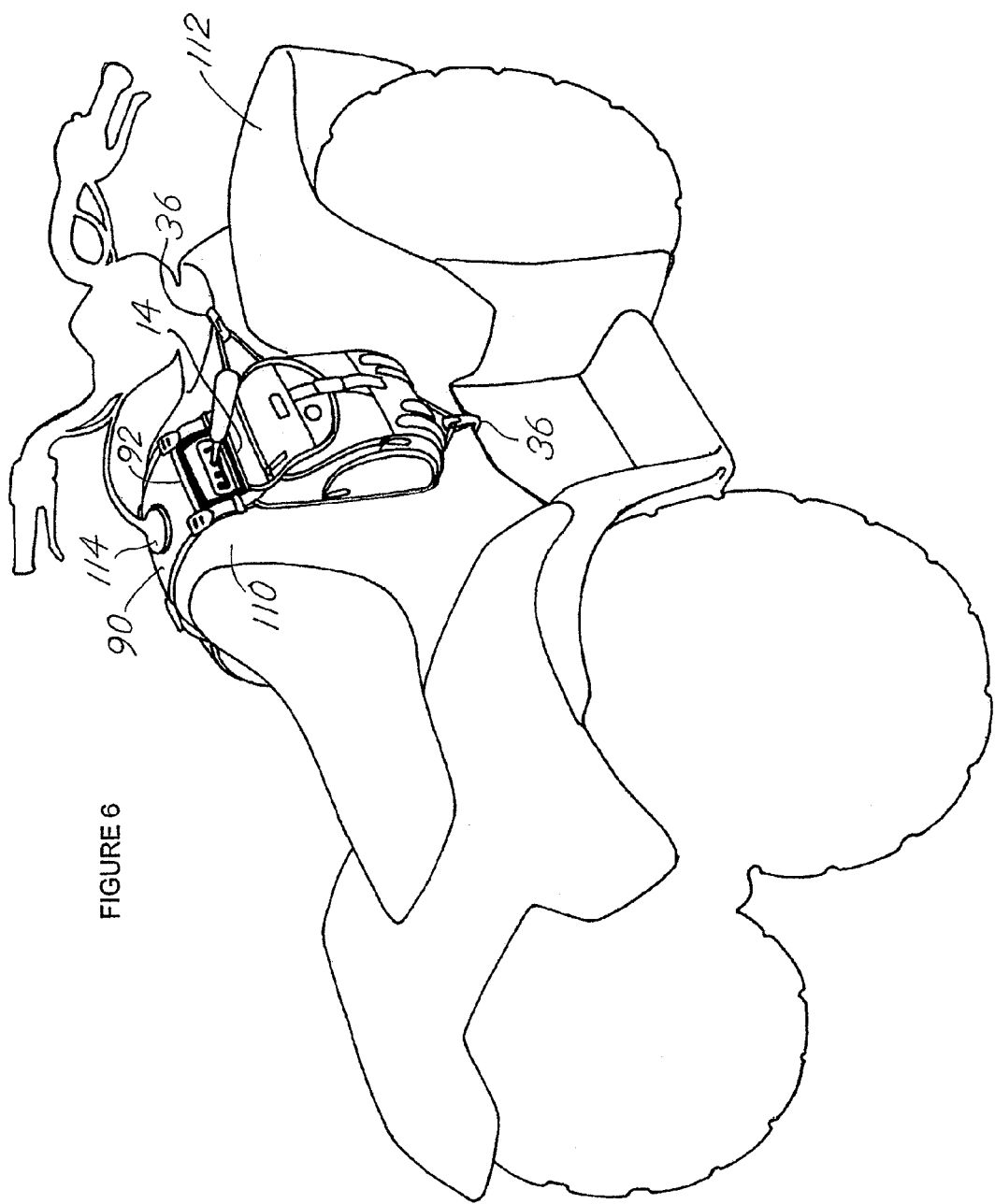
FIG. 6 is an isometric view illustrating utilization of the baggage construction of the invention.

To use the bag construction or tank bag of the invention, the bridge panel or center panel 90 is placed over the center ridge or tank, for example tank 110 of an all terrain vehicle 112, with the gas cap 114 projecting through the opening 96. It should be noted that the space between the edge 92 of the bridge panel 90 and the top edge 14 of the back side panel 10 is open so that gear shift levers or other levers associated with the operation of the vehicle 112 are accessible. The hook elements, for example hook elements 36 are attached to portions of the body of the vehicle 112 as illustrated in FIG. 6. The bag construction of the invention may be used in other circumstances, for example with motorbikes and other vehicles. The construction is extremely adjustable and yet is designed to be appropriately maintained in a fixed position on such a vehicle without slipping or sliding.

Variations of the construction may be effected without departing from the spirit and scope of the invention. For example, the configuration of the various straps may be altered. The configuration of the bags 70 and 72 may be altered or rearranged. The construction of hook elements may be varied. Additional hook elements may be included. Thus, the invention is to be limited only by the following claims and equivalents thereof.

What is claimed is:

1. Baggage for use in combination with an all terrain vehicle, motorcycle or vehicle having a center ridge extending between opposed, depending spaced side walls, said baggage comprising in combination:
    first and second storage bags, each storage bag including a back side panel with a bag enclosure affixed to each back side panel, said back side panels each including a top edge section, and a bottom edge, said back side panels being of generally congruent configuration;
    a bridge panel having first and second generally aligned, spaced lateral side edges, said bridge panel, positioned between the back side panels of said first and second storage bags, respectively, said respective back side panels being arrayed in spaced, opposed, back to back panel orientation, said first and second bridge panel lateral side edges, respectively, connected by adjustable length connection links to the top edge section of said first and second back side panels;
    at least one adjustable length hook attachment element extending from each of said first and second back side panels, each said hook attachment element including an attachment member configured for attachment to a side wall of said center ridge, to hold each bag on the vehicle with the bridge panel positioned over the center ridge; and
    at least one said attachment member including a cord with a hook member external of the storage bags, and a length adjustment device attached to a cord inside said storage bag.

2. The combination of claim 1 wherein the top edge section of at least one storage bag includes a flexible flap foldable over the said affixed bag and said connection links comprise adjustable length straps.

3. The combination of claim 1 further including a second adjustable hook attachment element extending from at least one of said back side panels for attachment to said vehicle to retain the baggage thereon.

4. The combination of claim 1 wherein the bridge panel includes a through passage therein.

5. The combination of claim 1 wherein at least one adjustable length hook attachment element comprises a cord having first and second runs each run extending through the same one of said first and second back panels said runs each connected to a hook member external of said storage bags and said first and second runs extending respectively through first and second spaced openings in said same back side panel.

6. The combination of claim 1 wherein the bridge panel connection links to said first and second storage bags include first and second straps connected from the bridge panel to one of said back panels.

7. An all terrain vehicle baggage assembly comprising, in combination:
    a first side bag having a first generally rectangular back side panel with a top and an inside edge;
    a second side bag having a second generally rectangular back side panel with a top and an inside edge;
    said first side bag and said second side bag each having the same general size and configuration back side panel and each back side panel including a storage bag mounted on the respective back side panel;
    a bridge panel with a passage therethrough, said bridge panel connected respectively to the first side bag back panel and to the second side bag side panel by at least one set of two spaced, adjustable length connection straps;
    a hook assembly attached to each back side panel, each hook assembly including a hook member external the respective back side panel and an adjustable length tether connecting the hook respective member to the respective back side panel, and
    at least one said hook assembly including said hook member connected to said tether and said tether including a cord extending into a bag through one of said back side panels with a clasp on the inside of the bag for engaging the cord to control the length of the cord on the outside of the bag.

8. Baggage for use in combination with an all terrain vehicle, motorcycle or vehicle having a center ridge extending between opposed, depending spaced side walls, said baggage comprising in combination:
    first and second storage bags, each storage bag including a back side panel with a bag enclosure affixed to each back side panel, said back side panels each including a top edge section and a bottom edge, said back side panels being of generally congruent configuration;
    a bridge panel having first and second generally aligned, spaced lateral side edges, said bridge panel, positioned between the back side panels of said first and second storage bags, respectively, said respective back side panels being arrayed in spaced, opposed, back to back panel orientation, said first and second bridge panel lateral side edges, respectively, connected by adjustable length connection links to the top edge section of said first and second back side panels;
    at least one adjustable length hook attachment element extending from each of said first and second back side panels, each said hook attachment element including an attachment member configured for attachment to a side wall of said center ridge, to hold each bag on the vehicle with the bridge panel positioned over the center ridge;
    at least said attachment member including a cord having first and second runs, each run extending through the same one of said back side panels, said first and second runs each connected to a hook member external of said storage bags and said first and second runs extending respectively through first and second spaced openings in said same back side panel.

9. The combination of claim 8 wherein the top edge section of at least one storage bag includes a flexible flap foldable over the said affixed bag and said connection links comprises adjustable length straps.

10. The combination of claim 8 further including a second adjustable hook attachment element extending from at least one of said back side panels for attachment to said vehicle to retain the baggage thereon.

11. The combination of claim 8 wherein at least one hook attachment element comprises a cord with a hook member external the storage bags, and a length adjustment device attached to a cord inside a storage bag.

12. The combination of claim 8 wherein the bridge panel includes a through passage therein.

13. The combination of claim 8 wherein the bridge panel connections to said first and second storage bags respectively each include first and second straps connected from the bridge panel to one of said back panels.

14. The combination of claim 8 wherein said cord comprises on elastic cord.

15. Baggage for use in combination with an all terrain vehicle, motorcycle or vehicle having a center ridge extending between opposed, depending spaced side walls, said baggage comprising in combination:

first and second storage bags, each storage bag including a back side panel with a bag enclosure affixed to each back side panel, said back side panels each including a top edge section and a bottom edge, said back side panels being of generally congruent configuration;

a bridge panel having first and second generally aligned, spaced lateral side edges, said bridge panel, positioned between the back side panels of said first and second storage bags, respectively, said respective back side panels being arrayed in spaced, opposed, back to back panel orientation, said first and second bridge panel lateral side edges, respectively, connected by adjustable length connection links to the top edge section of said first and second back side panels;

at least one adjustable length hook attachment element extending from each of said first and second back side panels, each said hook attachment element including an attachment member configured for attachment to a side wall of said center ridge, to hold each bag on the vehicle with the bridge panel positioned over the center ridge; and at least one said attachment member comprising a cord having first and second elastic runs, each run extending through the same one of said back panels, said first and second runs each connected to a single hook member external of said storage bags and said first and second runs extending respectively through first and second spaced openings in said same back side panel.

16. The combination of claim 15 wherein to top edge section of at least one storage bag includes a flexible flap foldable over the said affixed bag and said connection links comprises adjustable length straps.

17. The combination of claim 15 wherein the bridge panel includes a through passage therein.

18. The combination of claim 15 further including a second adjustable hook attachment element extending from at least one of said back side panels for attachment to said vehicle to retain the baggage thereon.

* * * * *